(12) United States Patent
Jiang et al.

(10) Patent No.: US 11,698,162 B2
(45) Date of Patent: Jul. 11, 2023

(54) ROTATION BRACKET (71) Applicant: Huawei Technologies Co., Ltd., Shenzhen (CN)

(72) Inventors: Yuxiao Jiang, Dongguan (CN); Chenglong Wang, Dongguan (CN); Zheng Song, Shanghai (CN); Haiquan Lv, Shanghai (CN); Dong Yuan, Hangzhou (CN); Chong Zheng, Hangzhou (CN); Wei Cai, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 17/138,282

(22) Filed: Dec. 30, 2020

(65) Prior Publication Data

US 2021/0116067 A1    Apr. 22, 2021

Related U.S. Application Data

(63) Continuation of application No. PCT/CN2019/087517, filed on May 20, 2019.

(30) Foreign Application Priority Data

Oct. 29, 2018    (CN) .......................... 201821760447.9

(51) Int. Cl.
*H01Q 1/12*    (2006.01)
*F16M 11/06*    (2006.01)
*F16M 13/02*    (2006.01)
*F16M 11/10*    (2006.01)
*F16M 11/04*    (2006.01)
*F16M 11/18*    (2006.01)

(52) U.S. Cl.
CPC ............ *F16M 11/06* (2013.01); *F16M 11/048* (2013.01); *F16M 11/105* (2013.01); *F16M 11/18* (2013.01); *F16M 13/02* (2013.01); *H01Q 1/1221* (2013.01)

(58) Field of Classification Search
CPC .... F16M 13/02; F16M 11/105; F16M 11/048; F16M 11/18; H01Q 1/1221; H01Q 1/125; H04M 1/04
See application file for complete search history.

(56) References Cited

U.S. PATENT DOCUMENTS 2,681,195 A    6/1954  Bradt et al.
3,208,703 A    9/1965  Arnold et al.
(Continued)

FOREIGN PATENT DOCUMENTS

CN    203571378 U    4/2014
CN    107542314 A    1/2018

*Primary Examiner* — Bradley Duckworth
(74) *Attorney, Agent, or Firm* — Slater Matsil, LLP (57) ABSTRACT

A rotation bracket includes an L-shaped connecting rod, a rotation mechanism, and a stand base. The L-shaped connecting rod includes a vertical rod and a horizontal rod. The vertical rod is configured to connect to a communications device. The horizontal rod is fastened to the rotation mechanism, and the horizontal rod is a rotatable rod. The rotation mechanism is fastened to a top of the stand base, and the rotation mechanism is configured to drive the L-shaped connecting rod to rotate in a horizontal plane. The stand base is configured to fixedly connect to an inner surface of a wall or to a ground.

20 Claims, 7 Drawing Sheets

(56) References Cited

U.S. PATENT DOCUMENTS

| | | | | |
|---|---|---|---|---|
| 4,235,405 A | * | 11/1980 | Carey | F16M 11/2064 |
| | | | | 343/882 |
| 5,526,010 A | * | 6/1996 | Plunk | H01Q 1/1235 |
| | | | | 343/882 |
| 5,673,057 A | * | 9/1997 | Toland | H01Q 19/191 |
| | | | | 343/781 CA |
| 5,982,340 A | * | 11/1999 | Troche | H01Q 1/1214 |
| | | | | 343/890 |
| 6,045,103 A | * | 4/2000 | Costa | F16M 11/10 |
| | | | | 248/278.1 |
| 6,682,029 B1 | | 1/2004 | Dierkes | |
| 6,731,250 B1 | | 5/2004 | Berman | |
| 7,683,853 B2 | * | 3/2010 | Michaelis | H01Q 1/125 |
| | | | | 343/882 |
| 8,339,329 B2 | * | 12/2012 | Shen | H01Q 1/125 |
| | | | | 343/882 |
| 8,760,361 B2 | * | 6/2014 | Lewry | H01Q 1/125 |
| | | | | 343/912 |
| 9,322,504 B2 | * | 4/2016 | Davi | F16M 11/2021 |
| 9,653,775 B2 | * | 5/2017 | Xiao | H01Q 3/08 |
| 10,476,129 B2 | * | 11/2019 | Woodling | H01Q 1/1228 |
| 2004/0223078 A1 | | 11/2004 | Zadok | |
| 2005/0196163 A1 | | 9/2005 | Mootz et al. | |
| 2015/0201511 A1 | | 7/2015 | Lee et al. | |
| 2019/0039529 A1 | * | 2/2019 | Zhou | B60R 11/0241 |

\* cited by examiner

ROTATION BRACKET

CROSS-REFERENCE TO RELATED APPLICATIONS

This application is a continuation of International Application No. PCT/CN2019/087517, filed on May 20, 2019, which claims priority to Chinese Patent Application No. 201821760447.9 filed on Oct. 29, 2018. The disclosures of the aforementioned applications are hereby incorporated by reference in their entireties.

TECHNICAL FIELD

This application relates to the mechanical field, and in particular, to a rotation bracket.

BACKGROUND

To meet a signal coverage requirement, a wireless communications device needs to be mounted on an outer surface of a wall of a high building.

In the prior art, a wireless communications device is fastened to an outer surface of a wall by using a plurality of bolts.

In this case, a hole needs to be drilled on the outer wall. Therefore, a construction worker needs to be suspended on an outer side of the wall to perform construction, and both the construction worker and the wireless communications device may fall off, making a mounting process unsafe.

SUMMARY

In view of this, this application provides a rotation bracket, to rotate a fastened communications device from an inner side of a wall to an outer side of the wall, to avoid a danger of construction outside the wall, thereby improving safety of mounting the communications device.

According to a first aspect, a rotation bracket is provided, including: an L-shaped connecting rod, a rotation mechanism, and a stand base. The L-shaped connecting rod includes a vertical rod and a horizontal rod. The vertical rod is configured to connect to a communications device. The horizontal rod is fastened to the rotation mechanism, and the horizontal rod is a rotatable rod. The rotation mechanism is fastened to a top of the stand base, and the rotation mechanism is configured to drive the L-shaped connecting rod to rotate in a horizontal plane. The stand base is configured to fixedly connect to an inner surface of a wall or to a ground.

According to this implementation, the horizontal rod is adjusted above the wall by adjusting a height of the stand base, then the communications device is fastened to the vertical rod, and then the horizontal rod is rotated, to adjust the vertical rod and the communications device above the wall. In this way, the L-shaped connecting rod can be rotated from the inner side of the wall to the outer side of the wall by using the rotation mechanism. Because the communications device is fastened to the vertical rod, the L-shaped connecting rod can drive the communications device to rotate from the inner side of the wall to the outer side of the wall. In this way, the communications device can be deployed on the outer side of the wall without construction outside the wall, thereby improving safety of mounting the communications device. After the communications device is rotated to the outer side of the wall, the vertical rod of the L-shaped connecting rod may be placed close to the outer surface of the wall by rotating the L-shaped connecting rod, so that the communications device is close to the outer surface of the wall and is lower than a top of the wall. In addition, a construction worker does not need to be suspended outside the wall, thereby greatly simplifying an operation of mounting the communications device, and reducing costs of mounting the communications device.

In a possible implementation, the rotation mechanism includes a support base, a support plate, and a rotation component. The horizontal rod passes through and is fastened to the support base, and the support base is fastened to the support plate. The support plate is connected to the rotation component, and the rotation component is connected to the stand base.

In another possible implementation, the support plate includes a first drawer plate, a second drawer plate, a telescopic member, and a first fastener. The first drawer plate includes a first fastening member and a through hole. The second drawer plate includes a second fastening member and a strip-shaped hole. The first drawer plate is fastened to the second drawer plate by the first fastener, and the first fastener passes through the through hole of the first drawer plate and the strip-shaped hole of the second drawer plate, so that the first drawer plate is in close contact with the second drawer plate. The telescopic member is connected to the first fastening member and the second fastening member, and is configured to adjust relative positions of the first drawer plate and the second drawer plate in a horizontal direction.

In another possible implementation, the first fastener is a bolt. The first fastening member and the second fastening member are each provided with a groove. The telescopic member includes a first double-headed nut, a second double-headed nut, and a screw rod. The first double-headed nut is fastened to the groove of the first fastening member. The second double-headed nut is fastened to the groove of the second fastening member. The first double-headed nut and the second double-headed nut are each connected to the screw rod by using a thread.

In another possible implementation, the horizontal rod is provided with a connecting component configured to connect to a power input device. The power input device is configured to drive the L-shaped connecting rod to rotate around an axis of the horizontal rod. The power input device may be a turbine worm reducer.

In another possible implementation, the horizontal rod is connected to a rotation member. The rotation member is configured to drive the L-shaped connecting rod to rotate around an axis of the horizontal rod.

In another possible implementation, the stand base is a liftable stand base. After the communications device is rotated to the outer side of the wall, the L-shaped connecting rod may be placed close to the wall by reducing the height of the stand base, so that the communications device is close to the wall.

In another possible implementation, the stand base includes an upright rod, a wall-mounted member, and a buckle member. A fastening component is disposed on a top of the upright rod. The fastening component is configured to connect to and support the rotation component. The wall-mounted member is configured to fixedly connect to the inner surface of the wall. The wall-mounted member and the buckle member are each provided with a groove for accommodating the upright rod. The buckle member is connected to the wall-mounted member by using a second fastener and is configured to fasten the upright rod between the buckle member and the wall-mounted member.

In another possible implementation, the stand base includes an upright rod, an upright cylinder, and a base. A fastening component is disposed on a top of the upright rod. The fastening component is configured to connect to and support the rotation component. The upright cylinder is fastened to the base. The upright cylinder is configured to support and fasten the upright rod. The base is configured to fixedly connect to the ground.

Optionally, the upright rod is provided with a plurality of through holes running through both sides of the upright rod. The plurality of through holes include through holes at different heights. A cylinder body of the upright cylinder is provided with at least one through hole. The upright cylinder is fastened to the upright rod by using a bolt. A screw rod of the bolt passes through the through hole of the upright cylinder and the through hole of the upright rod.

In another possible implementation, the stand base includes an upright rod and a base. A top of the upright rod is provided with a fastening component. The fastening component is configured to connect to and support the rotation component. The base includes a support frame, a counterweight frame, and a counterweight block. The support frame is provided with a fastening ring for fastening the upright rod. The support frame is connected to the counterweight frame. The counterweight frame includes a bottom plate for accommodating the counterweight block.

In another possible implementation, the counterweight plate is further provided with an upright cylinder for fastening the upright rod.

In another possible implementation, a plurality of balls are disposed between the rotation component and the fastening component.

In another possible implementation, a pipe configured to accommodate a cable of the communications device is disposed inside each of the vertical rod and the horizontal rod. The horizontal rod is provided with a small hole for the cable of the communications device to pass through.

DETAILED DESCRIPTION OF ILLUSTRATIVE EMBODIMENTS

A rotation bracket in this application is configured to support and fasten a communications device, and is mainly used when the communications device is mounted at a relatively high location (for example, a high building).

In the prior art, a communications device is fastened to an outer surface of a wall by using a plurality of bolts. In this way, a hole needs to be drilled on an outer surface of a wall of a high building to dispose a support, and then a wireless communications device is mounted on the support.

The prior art has the following disadvantages.

First, a construction worker needs to be suspended on an outer side of the wall to perform mounting, and both the construction worker and the wireless communications device may fall off, making a mounting process unsafe.

Second, to prevent the construction worker, the wireless communications device, or a part (such as a screw) of the wireless communications device from falling off and causing a danger to a pedestrian downstairs, it takes some time to dispose a fence at the bottom of the building on which the communications device is mounted.

Third, a scaffolding or a crane is required to suspend the construction worker on the outer side of the wall to perform mounting.

Fourth, there is also a hidden danger when a hardware fault occurring in the communications device requires a maintenance person to disassemble the communications device on the outer wall. In addition, disassembly and replacement require relatively more operations, making it inconvenient for replacement and maintenance.

Figure 1:
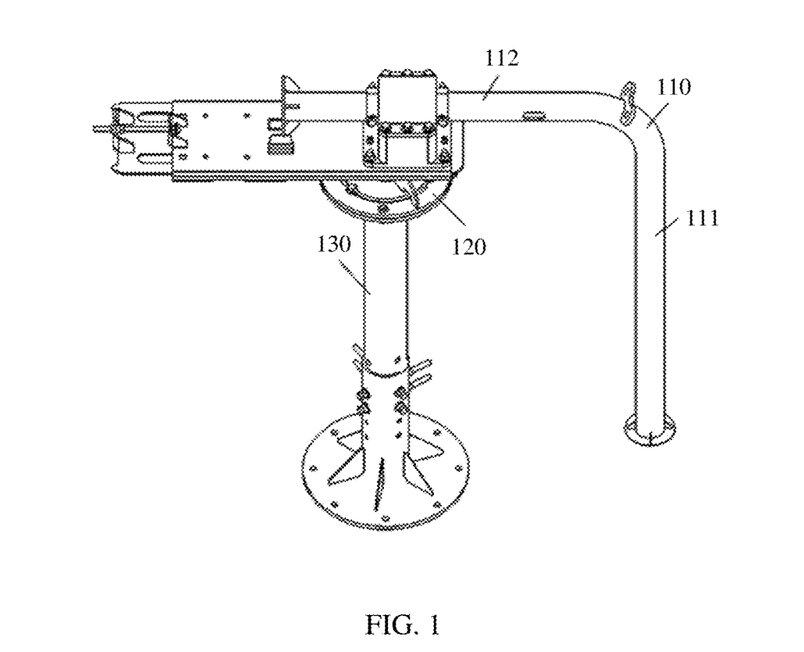
FIG. 1 is a schematic structural diagram of a rotation bracket according to this application.

To resolve the foregoing problem, this application provides a rotation bracket, to rotate a communications device from an inner side of a wall to an outer side of the wall, to avoid construction on the outer side of the wall, thereby improving safety of mounting the communications device. Details are described as follows:

Referring to FIG. 1, an embodiment of a rotation bracket provided in this application includes: an L-shaped connecting rod no, a rotation mechanism 120, and a stand base 130. The L-shaped connecting rod 110 includes a vertical rod 111 and a horizontal rod 112. The vertical rod 111 is configured to connect to a communications device. The horizontal rod 112 is a rotatable rod. The horizontal rod 112 is fastened to the rotation mechanism 120. The rotation mechanism 120 is fastened to a top of the stand base 130. The rotation mechanism 120 is configured to drive the L-shaped connecting rod no to rotate in a horizontal plane. The stand base 130 is fastened to an inner surface of a wall or to a ground.

In this embodiment, the L-shaped connecting rod no may be integrally formed, or may be formed by connecting an independent vertical rod and an independent horizontal rod. For example, the vertical rod 111 may be detachably connected to the horizontal rod 112. The vertical rod 111 may be detachably connected to the communications device. For example, the vertical rod 111 is connected to the communications device by using a fastener, and the fastener may be a bolt.

When the stand base 130 is placed at a position close to the wall, and the rotation mechanism 120 rotates, the vertical rod 111 and the communications device may be rotated from an inner side of the wall to an outer side of the wall. In this way, construction outside the wall can be avoided, thereby improving safety of mounting the communications device.

In an optional embodiment, a pipe configured to accommodate a cable of the communications device is disposed inside each of the vertical rod 111 and the horizontal rod 112. The horizontal rod 112 is provided with a small hole for the cable of the communications device to pass through. In this way, the cable of the communications device can enter the pipes of the vertical rod 111 and the horizontal rod 112 through a pipe opening of the vertical rod 111, and then pass out of the small hole of the horizontal rod 112. It may be understood that interiors of the vertical rod 111 and the horizontal rod 112 may alternatively not be hollow, and the cable of the communications device may alternatively be fastened to rod surfaces of the vertical rod 111 and the horizontal rod 112.

In another optional embodiment, the horizontal rod 112 is provided with a connecting component configured to connect to a power input device. The power input device is configured to drive the L-shaped connecting rod to rotate around an axis of the horizontal rod.

Specifically, one end of the horizontal rod is connected to the power input device by using a fastener. When the power input device is used to drive the L-shaped connecting rod to rotate around the axis of the horizontal rod, the L-shaped connecting rod drives the communications device to rotate, so that the communications device reaches above the wall. It may be understood that when the horizontal rod 112 may be placed on a top of the wall, rotating the L-shaped connecting rod no can enable the vertical rod 111 of the L-shaped connecting rod to be close to an outer surface of the wall, so that the communications device is close to the outer surface of the wall and is below the top of the wall. In this way, impact of an outer environment (for example, a wind) on the communications device can be reduced. The power input device may be a turbine worm reducer, a gear reducer, or the like.

Figure 2:
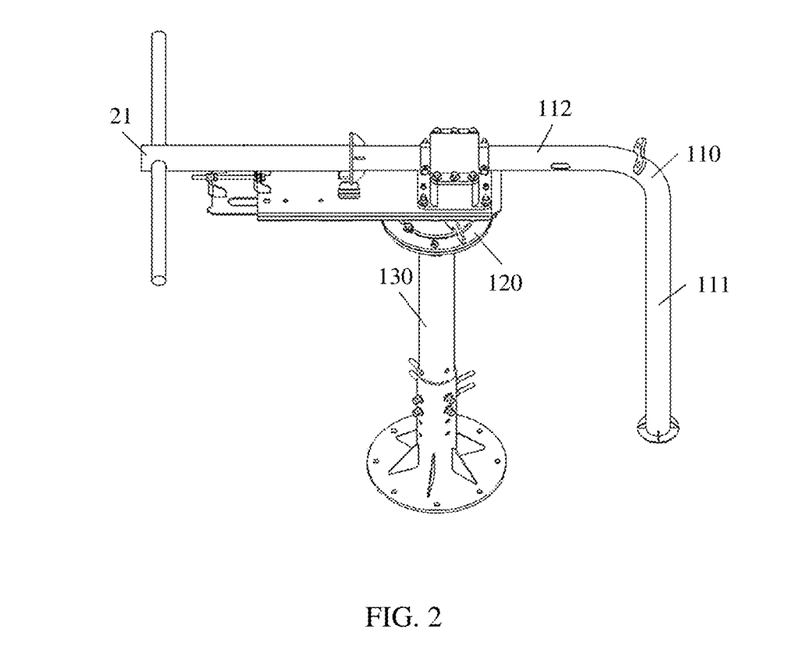
FIG. 2 is another schematic structural diagram of a rotation bracket according to this application.

Referring to FIG. 2, in another possible implementation, the horizontal rod 112 is connected to a rotation member 21. The rotation member 21 is configured to drive the L-shaped connecting rod no to rotate around an axis of the horizontal rod 112. Specifically, the rotation rod 21 may be a T-shaped rod or a cross-shaped rod, and the rotation member 21 may be disposed on a side away from the vertical rod 111. A user rotates the rotation member 21, so that the L-shaped connecting rod no and the communications device can rotate around the axis of the horizontal rod 112.

The rotation member 21 may be detachably connected to the horizontal rod 112. For example, the horizontal rod 112 is provided with a screw hole, one end that is of the rotation member 21 and that is used to connect to the horizontal rod 112 is provided with a thread, and the rotation member 21 is connected to the horizontal rod 112 by using the thread. It may be understood that the rotation member 21 may alternatively be another vertical rod disposed on a side that is of the horizontal rod 112 and that is away from the vertical rod 111, and a length of the vertical rod may be set based on an actual requirement. A longer vertical rod indicates a smaller force that is required to rotate the horizontal rod 112 by using the vertical rod.

Figure 3:
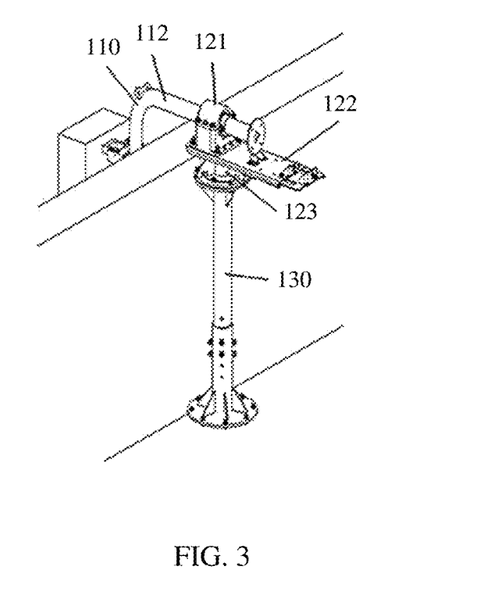
FIG. 3 is another schematic structural diagram of a rotation bracket according to this application.

Referring to FIG. 3, the communications device is fastened to the rotation bracket, and the rotation bracket is fastened to the ground and is close to the wall. In another optional embodiment, the rotation mechanism 120 includes a support base 121, a support plate 122, and a rotation component 123. The horizontal rod 112 passes through and is fastened to the support base 121. The support base 121 is fastened to the support plate 122. The support plate 122 is connected to the rotation component 123. The rotation component 123 is connected to the stand base 130.

In this embodiment, the support base 121 may fasten the horizontal rod 112 to prevent the horizontal rod 112 from sliding. The support base 121 includes a pipe capable of accommodating the horizontal rod 112. The horizontal rod 112 may be a round rod, to easily rotate in the pipe of the support base 121. It may be understood that, the support plate 122 is an optional component. When there is no support plate 122, the support base 121 may alternatively be directly connected to the rotation component 123, or the support base 121 and the rotation component 123 are integrally formed. The rotation component 123 may be mounted on the stand base 130 to rotate horizontally.

Figure 4:
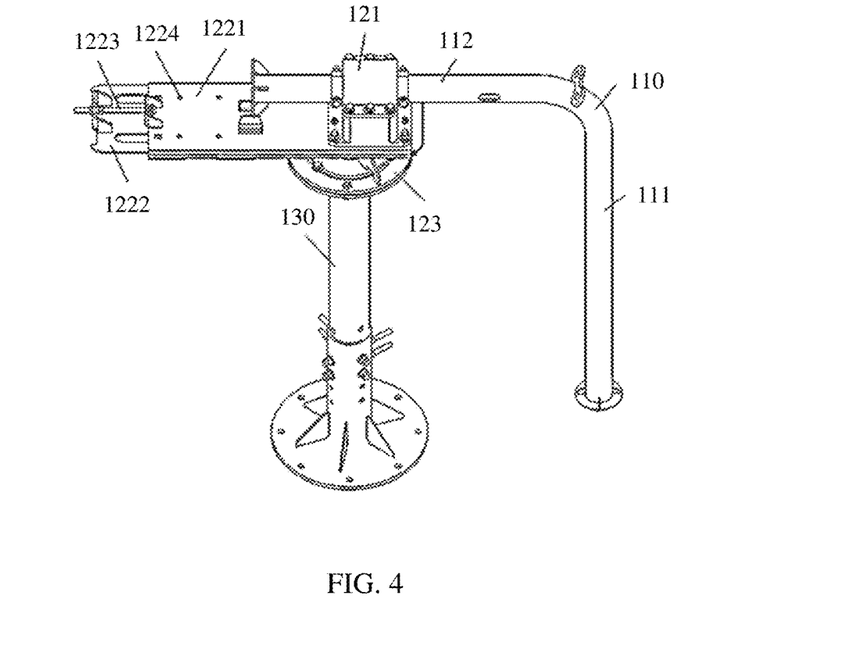
FIG. 4 is a schematic structural diagram of a rotation bracket having a drawer plate structure according to this application.
Figure 5:
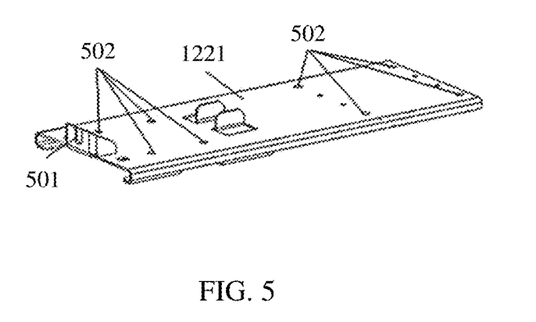
FIG. 5 is a schematic structural diagram of a first drawer plate according to this application.
Figure 6:
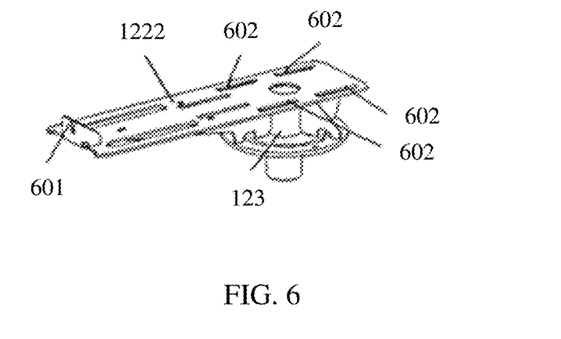
FIG. 6 is a schematic diagram of a second drawer plate and a rotation component according to this application.

Referring to FIG. 4 to FIG. 6, in another optional embodiment, the support plate 122 includes a first drawer plate 1221, a second drawer plate 1222, a telescopic member 1223, and a fastener 1224. The first drawer plate 1221 includes a first fastening member 501 and a through hole 502. The second drawer plate 1222 includes a second fastening member 601 and a strip-shaped hole 602. The first drawer plate 1221 is fastened to the second drawer plate 1222 by the first fastener 1224, and the first fastener 1224 passes through the through hole 502 of the first drawer plate 1221 and the strip-shaped hole 602 of the second drawer plate 1222, so that the first drawer plate 1221 is in close contact with the second drawer plate 1222. The telescopic member 1223 is connected to the first fastening member 501 and the second fastening member 601, and is configured to adjust relative positions of the first drawer plate 1221 and the second drawer plate 1222 in a horizontal direction.

In this embodiment, the first fastening member 501 and the second fastening member 601 are configured to fasten both ends of the telescopic member 1223. When the telescopic member 1223 telescopes, one end of the first fastener 1224 may move along the strip-shaped hole of the second drawer plate 1222, so that the first drawer plate 1221 can slide on the second drawer plate 1222. When the communications device and the vertical rod 111 are placed at positions close to the outer surface of the wall, sliding the first drawer plate 1221 can adjust a distance from the communications device to the outer surface of the wall. When the telescopic member 1223 is compressed, the communications device may be fastened at a position close to the outer surface of the wall, to reduce interference from an environmental factor (for example, a wind) to the communications device.

It may be understood that, the first drawer plate 1221 may also be provided with a strip-shaped hole, and the second drawer plate 1222 may also be provided with a through hole, so that the first drawer plate 1221 and the second drawer plate 1222 can also slide relative to each other. The foregoing describes use of the drawer plates in the rotation mechanism 120 to implement a sliding function. In addition, the sliding function may alternatively be implemented by using another type of structure. For example, an upper layer plate is provided with a sliding block, and a lower layer plate is provided with a sliding groove. When the sliding block slides in the sliding groove, the upper layer plate can slide relative to the lower layer plate.

Referring to FIG. 5 and FIG. 6, in an optional embodiment, the first drawer plate 1221 includes a first fastening member 501 and a through hole 502. The second drawer plate 1222 includes a second fastening member 601 and a strip-shaped hole 602. The first fastening member 501 and the second fastening member 601 are each provided with a groove.

Figure 7:
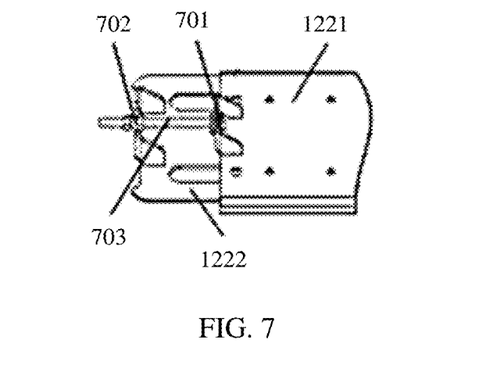
FIG. 7 is a schematic diagram of a telescopic member according to this application.

Referring to FIG. 7, the telescopic member 1223 includes a first double-headed nut 701, a second double-headed nut 702, and a screw rod 703. The first double-headed nut 701 is fastened to the groove of the first fastening member 501. The second double-headed nut 702 is fastened to the groove of the second fastening member 601. The first double-headed nut 701 and the second double-headed nut 702 are each connected to the screw rod 703 by using a thread.

In this embodiment, the first fastener 1224 may be a bolt, for example, a double-headed bolt. When the second double-headed nut 702 is rotated, a bottom end of the first fastener 1224 may move along the strip-shaped hole of the second drawer plate 1222, so that the first drawer plate 1221 can slide on the second drawer plate 1222, thereby adjusting the distance from the communications device to the outer surface of the wall is adjusted.

It should be noted that the telescopic member 1223 includes but is not limited to the foregoing examples. Alternatively, the telescopic member may be an elastic member, such as a spring. Alternatively, the telescopic member may be of a buckle structure.

Figure 8:
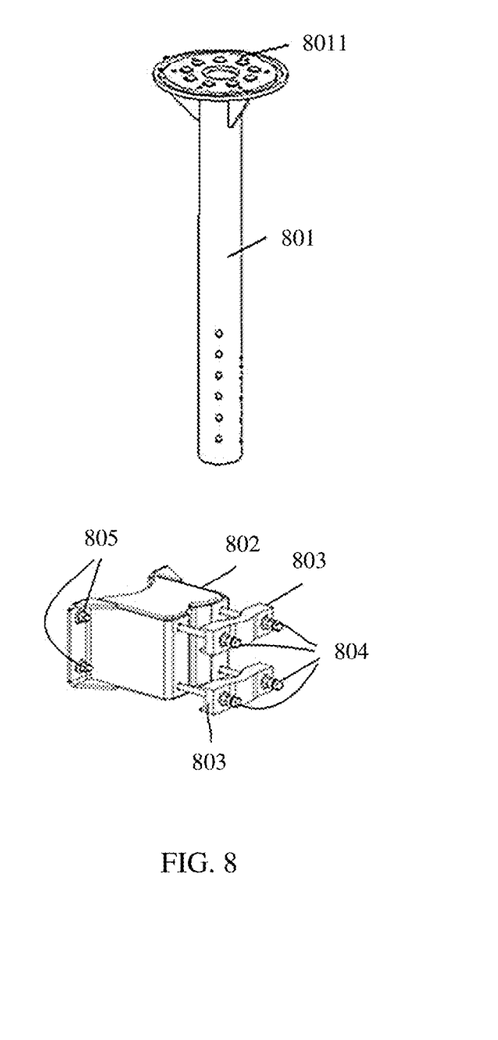
FIG. 8 is an exploded diagram of a stand base according to this application.

Referring to FIG. 8, in another optional embodiment, the stand base 130 includes an upright rod 801, a wall-mounted member 802, and a buckle member 803.

A fastening component 8011 is disposed on a top of the upright rod 801. The fastening component 8011 is configured to connect to and support the rotation component 123.

The wall-mounted member 802 is configured to fixedly connect to the inner surface of the wall.

The wall-mounted member 802 and the buckle member 803 are each provided with a groove for accommodating the upright rod 801.

The buckle member 803 is connected to the wall-mounted member 802 by using a second fastener 804 and is configured to fasten the upright rod 801 between the wall-mounted member 802 and the buckle member 803.

Optionally, the wall-mounted member 802 is provided with a through hole for a fastener 805 to pass through, and is fastened to the inner surface of the wall by the fastener 805. The fastener 805 may be an expansion bolt or a bolt of another type, or may be a nail.

Optionally, the second fastener 804 is a bolt, and a screw rod of the bolt is fastened to the wall-mounted member 802. The buckle member 803 is provided with a through hole for the screw rod to pass through. The upright rod 801 is placed between the groove of the wall-mounted member 802 and the groove of the buckle member 803. When the screw rod of the bolt passes through the through hole of the buckle member 803, a screw nut is rotated to make the buckle member 803 move towards the wall-mounted member 802. After the upright rod 801 is in close contact with both the grooves of the wall-mounted member 802 and the buckle member 803, the upright rod 801 is fastened between the wall-mounted member 802 and the buckle member 803. There may be one or more wall-mounted members 802 and one or more buckle members 803.

Optionally, the upright rod 801 is provided with a plurality of through holes running through both sides of the upright rod. The plurality of through holes include through holes at different heights. The wall-mounted member 802 is connected to the buckle member 803 by using the bolt 804. The screw rod of the bolt 804 passes through the through hole of the upright rod 801. The screw nut of the bolt 804 is disposed on a side away from the wall-mounted member 802. That the screw rod of the bolt 804 passes through the through hole of the upright rod 801 can prevent the upright rod 801 from moving up and down. Therefore, the bolt 804 may fasten the upright rod 801 between the wall-mounted member 802 and the buckle member 803. It should be noted that a height of the upright rod 801 can enable a height from the horizontal rod 112 to the ground to exceed a height of the wall.

Optionally, a plurality of balls are disposed between the rotation component 123 and the fastening component 8011. Specifically, a bottom of the rotation component 123 and/or a top of the fastening component 8011 is provided with a plurality of ball grooves. The ball grooves are used to accommodate the balls. The balls are used to reduce friction when the rotation component 123 rotates. The rotation component 123 and the fastening component 8011 are connected in a detachable manner, for example, connected by using a screw.

Figure 9:
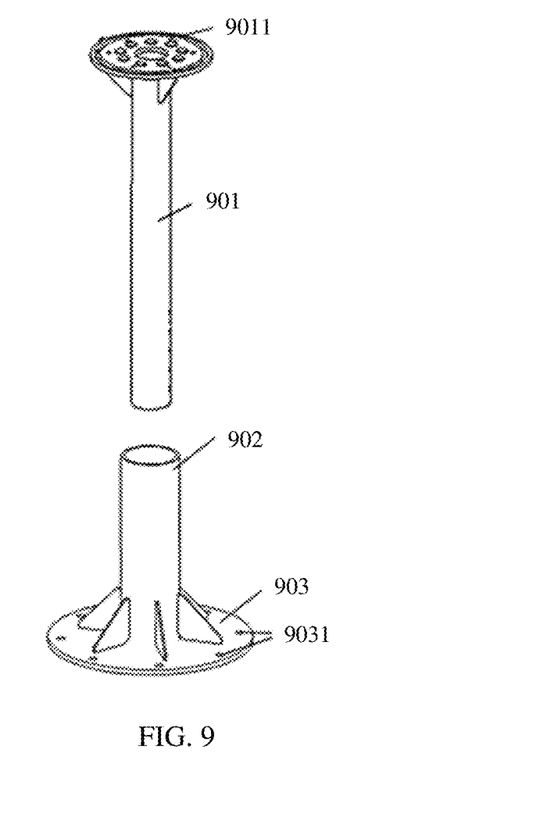
FIG. 9 is another exploded diagram of a stand base according to this application.

Referring to FIG. 9, in another optional embodiment, the stand base 130 includes an upright rod 901, an upright cylinder 902, and a base 903.

A fastening component 9011 is disposed on a top of the upright rod 901. The fastening component 9011 is configured to connect to and support the rotation component 123.

The upright cylinder 902 is fastened to the base 903. The upright cylinder 902 is configured to support and fasten the upright rod 901.

The base 903 is configured to fixedly connect to the ground.

In this embodiment, the upright rod 901 is inserted into the upright cylinder 902. The upright cylinder 902 may support and fasten the upright rod 901. The base 903 may be connected to the ground by a fastener, and be fastened to the ground. For example, when the base 903 is connected and fastened to the ground by using a bolt, the base 903 is provided with a through hole 9031 for the bolt to pass through. The base 903 may be connected and fastened to the ground. Therefore, there is no need to drill a hole on the wall, thereby maintaining integrity of the inner surface of the wall. It should be noted that a height of the upright rod 901 can enable a height from the horizontal rod 112 to the ground to exceed a height of the wall.

The fastening component 9011 is similar to the fastening component 8011 in the embodiment shown in FIG. 8. For a structure of the fastening component 9011 and a connection relationship between the fastening component 9011 and the rotation component 123, refer to corresponding descriptions in the embodiment shown in FIG. 8.

Figure 10:
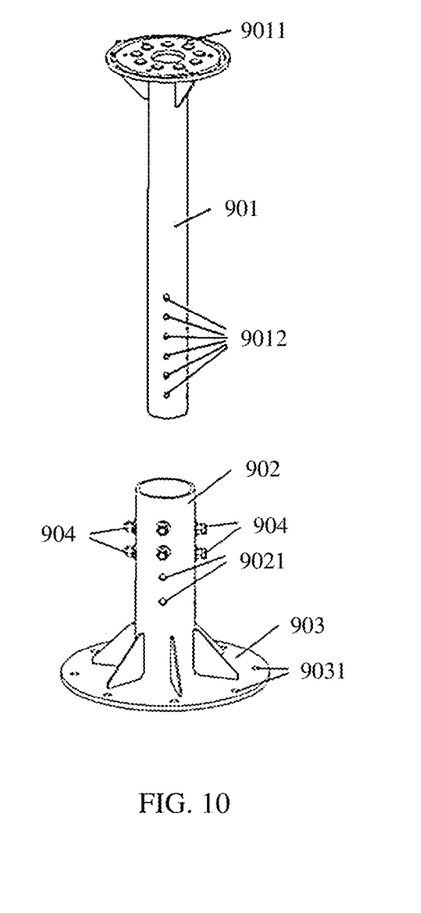
FIG. 10 is another exploded diagram of a stand base according to this application.

Referring to FIG. 10, in an optional embodiment, the upright rod 901 is provided with a plurality of through holes 9012 running through both sides of the upright rod. The plurality of through holes include through holes at different heights. The upright cylinder 902 is provided with a through hole 9021 corresponding to the through hole 9012 of the upright rod 901. The upright cylinder 902 and the upright rod 901 are fastened by a double-headed bolt 904. The double-headed bolt 904 passes through the through hole 9021 of the upright cylinder 902 and the through hole 9012 of the upright rod 901.

When the double-headed bolt 904 passes through the through holes 9012 at different heights and the upright cylinder 902 and the upright rod 901 are fastened by the double-headed bolt 904, the upright rod 901 may be fastened at different heights, so that the height from the horizontal rod 112 to the ground can be adjusted.

Figure 11:
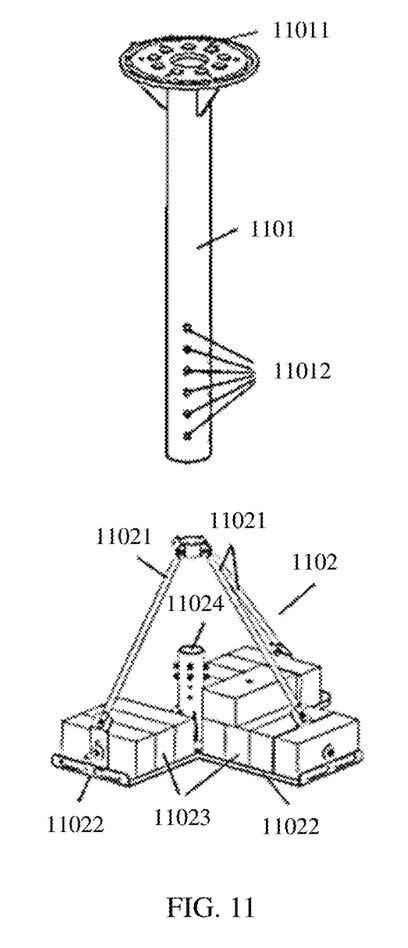
FIG. 11 is another exploded diagram of a stand base according to this application.

Referring to FIG. 11, in another optional embodiment, the stand base 130 includes an upright rod 1101 and a base 1102. A fastening component 11011 is disposed on a top of the upright rod 1101. The fastening component 11011 is configured to connect to and support the rotation component 123. The upright rod 1101 is provided with a plurality of through holes 11012 running through both sides of the upright rod. The plurality of through holes include through holes at different heights. The base 1102 includes a support frame 11021, a counterweight frame 11022, a counterweight block 11023, and an upright cylinder 11024. The support frame 11021 is connected to the counter weight frame 11022. The support frame 11021 is provided with a fastening ring for fastening the upright rod 1101. The counterweight frame 11022 includes a bottom plate for accommodating the counterweight block 11023. The upright cylinder 11024 is fastened to the bottom plate.

Specifically, the base 1102 includes the support frame 11021, the counterweight frame 11022, and the counterweight block 11023. Therefore, the counterweight block 11023 can provide a support force for the upright rod 1101 by using the support frame 11021 and the counterweight frame 11022, thereby implementing a support function. In this way, there is no need to drill a hole on the ground, thereby maintaining integrity of the ground.

It should be noted that the through hole 11012 and the upright cylinder 11024 are not necessary, and the upright rod 1101 can be prevented from tilting or falling down without the upright cylinder 11024. It should be noted that the upright rod 1101 is similar to the upright rod 901. For a specific structure and a connection relationship of the upright rod 1101, refer to related descriptions of the upright rod 901.

The fastening component 11011 is similar to the fastening component 8011 in the embodiment shown in FIG. 8. For a structure of the fastening component 11011 and a connection relationship between the fastening component 11011 and the rotation component 123, refer to corresponding descriptions in the embodiment shown in FIG. 8. It may be understood that, when the bolt passes through the through holes at different heights to fasten the upright rod 1101 and the upright cylinder 11024, a height of the upright rod 1101 may be adjusted, so that the height of the horizontal rod 112 can exceed walls at different heights.

For ease of understanding, the following describes a method for mounting and maintaining the rotation bracket in this application.

In the following specific application scenario, the L-shaped connecting rod 110 includes the vertical rod 111 and the horizontal rod 112. The rotation mechanism 120 includes the support base 121, the support plate 122, and the rotation component 123. The support plate 122 includes the first drawer plate 1221, the second drawer plate 1222, the telescopic member 1223, and the first fastener 1224. The telescopic member 1223 includes the first double-headed nut 701, the second double-headed nut 702, and the screw rod 703. The first fastener 1224 is a double-headed bolt. The stand base 130 includes the upright rod 801, the wall-mounted member 802, and the buckle member 803.

First, the wall-mounted member 802 is mounted on an inner surface of a parapet wall. Then, the upright rod 801 is fastened between the wall-mounted member 802 and the buckle member 803 by using the buckle member 803 and the bolt 804. The rotation component 123 and the fastening component 8011 are fastened by using a screw, and then the support plate 122 is assembled, so that the first drawer plate 1221 and the second drawer plate 1222 may slide relative to each other. The horizontal rod 112 passes through the support base 121 and is fixedly mounted on the first drawer plate 1221. The communications device is fastened to the vertical rod 111. When the vertical rod 111 and the horizontal rod 112 are hollow inside, a cable of the communications device passes through the vertical rod 111 and the horizontal rod 112, and passes out of a cable outlet of the horizontal rod 112.

The horizontal rod 112 is connected to a turbine worm reducer. The turbine worm reducer may be controlled to rotate the L-shaped connecting rod no and the communications device. After the communications device rotates above a top of the parapet wall, the turbine worm reducer is controlled to stop rotating. The rotation component 123 is pushed to rotate horizontally around an axis of the fastening component 8011, to rotate the L-shaped connecting rod no and the communications device from an inner side of the wall to an outer side of the wall. The turbine worm reducer is then controlled to rotate the horizontal rod 112 to reduce a height of the communications device, so that the communications device is mounted below a top surface of the wall. Relative positions of the first drawer plate 1221 and the second drawer plate 1222 may be adjusted by rotating the first double-headed nut 701 or the second double-headed nut 702, to adjust the communications device to a position close to the outer surface of the wall.

It can be learned that, the communications device can be rotated from the inner side of the wall to the outer side of the wall by using the rotation bracket, so that construction outside the wall is not required, thereby improving safety of mounting the communications device.

During replacement or maintenance of the communications device, the turbine worm reducer and the horizontal rod 112 may be connected, to control the turbine worm reducer to drive the L-shaped connecting rod no and the communications device to rotate, so that the communications device exceeds the top surface of the wall. Then, the rotation component 123 is pushed to drive the L-shaped connecting rod no and the communications device to rotate in the horizontal plane, so that the communications device is rotated from the outer side of the wall to the inner side of the wall, thereby replacing or maintaining the communications device. It can be learned that, the replacement or maintenance of the communications device does not require construction outside the wall, thereby improving safety of replacing or maintaining the communications device.

This application further provides a rotation bracket. The rotation bracket includes a horizontal rod, a rotation mechanism, and a stand base. The horizontal rod is fastened to the rotation mechanism. The horizontal rod is configured to connect to a communications device. The rotation mechanism is fastened to a top of the stand base. The rotation mechanism is configured to drive the horizontal rod to rotate in a horizontal plane. The stand base is connected to an inner surface of a wall or to a ground.

In this embodiment, one end of the horizontal rod is connected to the communications device. When the stand base is placed at a position close to the wall, and the rotation mechanism rotates, the communications device disposed on the horizontal rod may be rotated from an inner side of the wall to an outer side of the wall. In this way, construction outside the wall can be avoided, thereby improving safety of mounting the communications device. For the rotation mechanism and the stand base, refer to corresponding descriptions of the rotation mechanism 120 and the stand base 130 in the foregoing embodiments.

What is claimed is:

1. A rotation bracket, comprising:
   an L-shaped connecting rod, comprising a vertical rod and a horizontal rod, wherein the vertical rod is connectable to a communications device, and the horizontal rod is rotatable;
   a rotation mechanism fastened to the horizontal rod, wherein the rotation mechanism is configured to drive the L-shaped connecting rod to rotate in a horizontal plane; and
   a stand base, wherein the rotation mechanism is fastened to a top of the stand base, and the stand base is fixedly connectable to an inner surface of a wall or to a ground; and wherein the rotation mechanism comprises a support base, a support plate, and a rotation component;
wherein the horizontal rod passes through and is fastened to the support base, and the support base is fixedly fastened to the support plate; and
wherein the support plate is connected to the rotation component, and the rotation component is connected to the stand base.

2. The rotation bracket according to claim 1, wherein:
the support plate comprises a first drawer plate, a second drawer plate, a telescopic member, and a first fastener;
the first drawer plate comprises a first fastening member and a through hole;
the second drawer plate comprises a second fastening member and a strip-shaped hole;
the first drawer plate is fastened to the second drawer plate by the first fastener, and the first fastener passes through the through hole of the first drawer plate and the strip-shaped hole of the second drawer plate, causing the first drawer plate to be in close contact with the second drawer plate; and
the telescopic member is connected to the first fastening member and the second fastening member, and is configured to adjust relative positions of the first drawer plate and the second drawer plate in a horizontal direction.

3. The rotation bracket according to claim 2, wherein:
the first fastener is a bolt;
a groove extends in each of the first fastening member and the second fastening member; and
the telescopic member comprises a first double-headed nut, a second double-headed nut, and a screw rod, wherein the first double-headed nut is fastened to the groove extending in the first fastening member, the second double-headed nut is fastened to the groove extending in the second fastening member, and the first double-headed nut and the second double-headed nut are each connected to the screw rod by using a thread.

4. The rotation bracket according to claim 1, wherein:
the stand base comprises an upright rod, a wall-mounted member, and a buckle member;
a fastening component is disposed on a top of the upright rod, and the fastening component connects to the rotation component and supports the rotation component;
the wall-mounted member is fixedly connected to the inner surface of the wall;
a groove of the wall-mounted member and a groove of the buckle member are configured to accommodate the upright rod; and
the buckle member is connected to the wall-mounted member by using a second fastener and is configured to fasten the upright rod between the buckle member and the wall-mounted member.

5. The rotation bracket according to claim 4, wherein a plurality of balls are disposed between the rotation component and the fastening component.

6. The rotation bracket according to claim 1, wherein:
the stand base comprises an upright rod, an upright cylinder, and a base;
a fastening component is disposed on a top of the upright rod, and the fastening component is configured to connect to and support the rotation component;
the upright cylinder is fastened to the base, and the upright cylinder is configured to support and fasten the upright rod; and
the base is configured to fixedly connect to the ground.

7. The rotation bracket according to claim 6, wherein:
a plurality of through holes run through a plurality of sides of the upright rod, and the plurality of through holes comprise through holes at different heights; and
a cylinder body of the upright cylinder comprises at least one through hole, the upright cylinder is fastened to the upright rod by using a bolt, and a screw rod of the bolt passes through the through hole of the upright cylinder and a through hole of the plurality of through holes.

8. The rotation bracket according to claim 1, wherein:
the stand base comprises an upright rod and a base;
a fastening component is disposed on a top of the upright rod, and the fastening component connects to and supports the rotation component; and
the base comprises a support frame, a counterweight frame, and a counterweight block, wherein the support frame comprises a fastening ring for fastening the upright rod, the support frame is connected to the counterweight frame, and the counterweight frame comprises a bottom plate for accommodating the counterweight block.

9. The rotation bracket according to claim 8, wherein the base further comprises an upright cylinder for fastening the upright rod.

10. The rotation bracket according to claim 1, wherein the horizontal rod is connected to a rotation member, and the rotation member is configured to drive the L-shaped connecting rod to rotate around an axis of the horizontal rod.

11. The rotation bracket according to claim 1, wherein:
a first cavity configured to accommodate a cable of the communications device is inside the vertical rod and a second cavity configured to accommodate a cable of the communications device is inside the horizontal rod; and
the horizontal rod comprises a hole configured to allow the cable of the communications device to pass through.

12. The rotation bracket according to claim 1, wherein the L-shaped connecting rod is integrally formed to be a single rod.

13. The rotation bracket according to claim 1, wherein a major surface of the support plate faces away from the stand base, and the major surface of the support plate extends past the L-shaped connecting rod in a horizontal direction.

14. The rotation bracket according to claim 1, wherein a major surface of the support plate faces away from the stand base, and the major surface of the support plate extends past the stand base in a horizontal direction.

15. The rotation bracket according to claim 1, wherein the support plate is configured to enable the vertical rod to slide horizontally towards the stand base.

16. The rotation bracket according to claim 1, wherein the support base and the rotation component are integrally formed.

17. A system, comprising:
a communications device; and
a rotation bracket, comprising:
an L-shaped connecting rod, comprising a vertical rod and a horizontal rod, wherein the vertical rod is connectable to the communications device, and the horizontal rod is rotatable;
a rotation mechanism fastened to the horizontal rod, wherein the rotation mechanism is configured to drive the L-shaped connecting rod to rotate in a horizontal plane; and a stand base, wherein the rotation mechanism is fastened to a top of the stand base, and the stand base is fixedly connectable to an inner surface of a wall or to a ground;

wherein the rotation mechanism comprises a support base, a support plate, and a rotation component;

wherein the horizontal rod passes through and is fastened to the support base, and the support base is fixedly fastened to the support plate; and wherein the support plate is connected to the rotation component, and the rotation component is connected to the stand base.

18. The system according to claim 17, wherein:

the support plate comprises a first drawer plate, a second drawer plate, a telescopic member, and a first fastener;

the first drawer plate comprises a first fastening member and a through hole;

the second drawer plate comprises a second fastening member and a strip-shaped hole;

the first drawer plate is fastened to the second drawer plate by the first fastener, and the first fastener passes through the through hole of the first drawer plate and the strip-shaped hole of the second drawer plate, causing the first drawer plate to be in close contact with the second drawer plate; and the telescopic member is connected to the first fastening member and the second fastening member, and is configured to adjust relative positions of the first drawer plate and the second drawer plate in a horizontal direction.

19. The system according to claim 18, wherein:

the first fastener is a bolt;

a groove extends in each of the first fastening member and the second fastening member; and the telescopic member comprises a first double-headed nut, a second double-headed nut, and a screw rod, wherein the first double-headed nut is fastened to the groove extending in the first fastening member, the second double-headed nut is fastened to the groove extending in the second fastening member, and the first double-headed nut and the second double-headed nut are each connected to the screw rod by using a thread.

20. The system according to claim 17, wherein the support base directly overlies the support plate.

* * * * *